United States Patent
Wang

(10) Patent No.: US 11,971,959 B2
(45) Date of Patent: Apr. 30, 2024

(54) DATA TEST METHOD, ELECTRONIC DEVICE AND STORAGE MEDIUM

(71) Applicant: HON HAI PRECISION INDUSTRY CO., LTD., New Taipei (TW)

(72) Inventor: Cheng-Feng Wang, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 427 days.

(21) Appl. No.: 17/333,472

(22) Filed: May 28, 2021

(65) Prior Publication Data

US 2021/0383162 A1    Dec. 9, 2021

(30) Foreign Application Priority Data

Jun. 9, 2020    (CN) .................. 202010515895.8

(51) Int. Cl.
*G06F 11/30* (2006.01)
*G06F 18/23* (2023.01)
*G06F 18/23211* (2023.01)
*G06F 18/2413* (2023.01)

(52) U.S. Cl.
CPC ........ *G06F 18/23211* (2023.01); *G06F 18/23* (2023.01); *G06F 18/24137* (2023.01); *G06F 18/24147* (2023.01)

(58) Field of Classification Search
CPC ................................. G06F 18/23211
See application file for complete search history.

(56) References Cited

U.S. PATENT DOCUMENTS

2020/0294074 A1*   9/2020   Yang ................. G06Q 20/4093

FOREIGN PATENT DOCUMENTS

| CN | 110674603 |   | 1/2020 |
| CN | 113837596 | A * | 12/2021 |
| TW | 201415258 |   | 4/2014 |
| TW | 201931156 |   | 8/2019 |

* cited by examiner

Primary Examiner — Phuong Huynh
(74) Attorney, Agent, or Firm — ScienBiziP, P.C.

(57) ABSTRACT

A data test method, an electronic device, and a storage medium are provided. In the data test method, based on a Density-Based Spatial Clustering of Applications with Noise (DBSCAN), at least one cluster is obtained by removing discrete points in the target data and performing clustering, an calculation result is obtained by performing a regression analysis on the target data with the objective function, and parameters to be tested are verified according to the calculation result. Utilizing the data test method, objective function can be used to perform verification and residual analysis on the target data, related descriptions are be repeated here.

14 Claims, 2 Drawing Sheets

DATA TEST METHOD, ELECTRONIC DEVICE AND STORAGE MEDIUM

FIELD

The present embodiments relates to a technology field of data processing, and particularly to a data test method, an electronic device, and a storage medium.

BACKGROUND

Each work station on a production line provides a certain process to a product. To ensure a normal operation of the production line, the certain process on the production line needs to be tested after completion. Only after passing a test, a next station is entered. The next station has another set of preliminary tests to ensure quality of semi-finished products from a previous working station.

When the test reveals failure of the production line, reworking and repairs need to be executed, and costs may be increased. Therefore, it is desirable to predict whether the preliminary tests can be passed before entering the next station, wherein a length of time for testing and maintenance can be shortened.

To predict test results of the next station, it is usually necessary to rely on experience and guess work which test parameters of two stations are related, and which calculation of function needs to be used, and then perform a regression analysis. However, each station can have thousands or hundreds of test parameters, and manual analysis are not efficient. Therefore, automated analysis and testing of functional relationship between all parameters is desirable.

DETAILED DESCRIPTION

In order to make objects, technical solutions and advantages of a present embodiments more comprehensible, the present embodiments is described in detail below with reference to drawings and specific embodiments.

Figure 1:
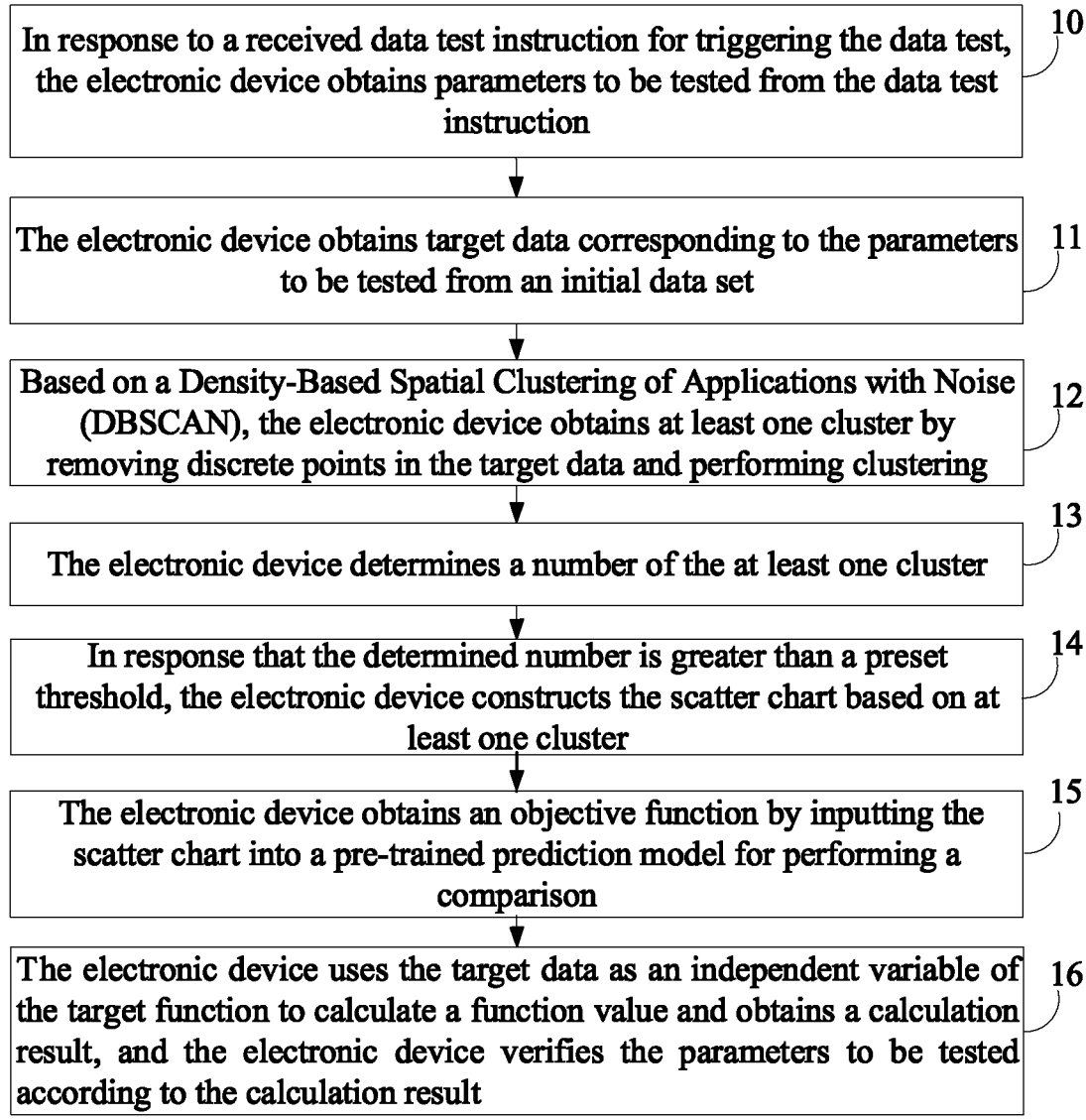
FIG. 1 is a flowchart of an embodiment of a data test method.

FIG. 1 is a flowchart of an embodiment of a data test method. According to different requirements, an order of blocks in the flowchart can be changed, and some blocks can be deleted.

The data test method can be applied to one or more electronic devices. An electronic device can automatically perform numerical calculation and/or information processing according to an instruction configured or stored in advance, and hardware of the electronic device can include, but is not limited to, a microprocessor, an Application Specific Integrated Circuit (ASIC), a Field-Programmable Gate Array (FPGA), a Digital Signal Processor (DSP), an embedded device, etc.

The electronic device can be any electronic product that can interact with users, such as a personal computer, a tablet computer, a smart phone, a personal digital assistant (PDA), a game machine, an Interactive Network Television (IPTV), and smart wearable devices, etc.

The electronic device can also be a network device and/or user equipment. The network device can include, but is not limited to, a single network server, a server group including a plurality of network servers, or a cloud computing system including a plurality of hosts or network servers.

The electronic device can be connected to a network. The network can include, but is not limited to, the Internet, a wide region network, a metropolitan region network, a local region network, a virtual private network (VPN), and the like.

At block 10, in response to a received data test instruction for triggering the data test, the electronic device obtains parameters to be tested from the data test instruction.

The data test instruction can be triggered by related workers, such as testers.

In one embodiment, the parameters to be tested may include, but are not limited to, one or a combination of followings:

Voltage, resistance, current, frequency, temperature, and the like.

At block 11, the electronic device obtains target data corresponding to the parameters to be tested from an initial data set.

For example, when the parameters to be tested are voltages, the target data is a specific value of the voltages in the initial data set.

In one embodiment, before obtaining the target data corresponding to the parameters to be tested from the initial data set, the method further includes that: the electronic device constructs the initial data set.

A method for constructing the initial data set includes that: the electronic device determines a target working station that the parameters to be tested belongs to, and acquires data of a previous working station corresponding to the target working station. The electronic device constructs the initial data set by using the acquired data.

According to the above embodiments, correctness of parameter settings in a following station can be effectively verified based on the data of the previous working station.

In other embodiments, current station data can also be used to test a current station, the present embodiments is not so limited.

At block 12, based on a Density-Based Spatial Clustering of Applications with Noise (DBSCAN), the electronic device obtains at least one cluster by removing discrete points in the target data and performing clustering.

In other embodiments, a method for obtaining at least one cluster by removing discrete points in the target data and performing clustering based on the DBSCAN includes that: the electronic device obtains core points, boundary points, and noise points by marking the target data. The electronic device determines the noise points as discrete points, and deletes the discrete points. The electronic device calculates a first distance between every two core points. The electronic device obtains at least one initial cluster by connecting all the core points within epsilon (Eps) at a first distance. For each boundary point, the electronic device calculates a second distance between the boundary point and a center point of each of the at least one initial cluster. The electronic device divides the boundary points into initial clusters corresponding to a smallest second distance. The electronic device obtains the at least one cluster by integrating all divided initial clusters.

The Eps refers to a DBSCAN algorithm parameter, and the Eps belongs to a distance threshold.

In one embodiment, a number of the at least one cluster to be formed of the DBSCAN do not need to be known in advance, and the noise points can be identified and removed. Clusters of any shape can be found, recognition ability is better, and the DBSCAN is more suitable for station parameters.

At block 13, the electronic device determines a number of the at least one cluster.

In one embodiment, the determined number is used to determine whether conditions for constructing a scatter chart are met.

At block 14, in response that the determined number is greater than a preset threshold, the electronic device constructs the scatter chart based on at least one cluster.

For example, the preset threshold may be 0.

The method of constructing the scatter chart is not limited by the above mentioned embodiments.

In one embodiment, when the determined number is less than or equal to the preset threshold, the test is terminated.

At block 15, the electronic device obtains an objective function by inputting the scatter chart into a pre-trained prediction model for performing a comparison.

In one embodiment, the method further includes that: the electronic device trains the prediction model.

A method for training the prediction model includes that: the electronic device obtains all scatter charts in historical data. The electronic device obtains the prediction model by performing a classification training on all the scatter charts.

Specifically, the method for training the prediction model includes: obtaining all scatter plots in historical data; acquiring a first number of scatter plots from the all scatter plots as training data, and acquiring a second number of scatter plots as test data, where the first number is greater than the second number; using the training data to train a preset neural network model to obtain a prediction model; using the test data to test the prediction model and calculating a test pass rate; determining whether the test pass rate is greater than a preset pass rate threshold; when the test pass rate is greater than the preset pass rate threshold, ending the training of the prediction model.

When the test pass rate is less than or equal to the preset pass rate threshold, a third number of scatter plots from the all scatter plots are obtained and added to the training data to obtain new training data; use the new training data to train the preset neural network model the to obtain a new prediction model. The test data is used to test the new predictive model. Repeat the above process until the test pass rate is greater than the preset pass rate threshold, the training is stopped.

According to the above embodiments, the prediction model is trained according to the historical data, the prediction model can be used in more comprehensive technology fields.

The method further includes that: when the comparison of the scatter chart is failed, the electronic device determines a type of the scatter chart. The electronic device obtains a function corresponding to the type of the scatter chart. The electronic device uses the obtained function as a risk loss function of the prediction model to retrain the prediction.

In one embodiment, when the comparison of the scatter chart is failed, a function corresponding to the scatter chart may not be obtained.

By performing the retraining on the prediction model, the prediction model can be continuously updated according to a current test situation, thus ensuring the greater reliability and accuracy of the prediction model. The process of using the risk loss function to calculate a risk loss and the process of retraining the prediction model are existing technologies and will not be elaborated.

In one embodiment, a method for obtaining the objective function by inputting the scatter chart into the pre-trained prediction model for performing a comparison includes that: the electronic device obtains the objective function by applying a configuration image comparison algorithm to input the scatter chart into the prediction model for performing a comparison.

The configuration image comparison algorithm may include, but is not limited to a pixel point comparison algorithm, or a block comparison algorithm, the present embodiments is not so limited.

At block 16, the electronic device uses the target data as an independent variable of the target function to calculate a function value and obtains a calculation result, and the electronic device verifies the parameters to be tested according to the calculation result.

In one embodiment, the electronic device outputs the calculation result.

In one embodiment, a method for using the target data as an independent variable of the target function to calculate a function value and obtaining a calculation result, and verifying the parameters to be tested according to the calculation result, includes that: the electronic device acquires current data corresponding to the parameters to be tested, and acquires prediction data corresponding to the parameters to be tested from the calculation result. The electronic device calculates a similarity between the prediction data and the current data. When the similarity between the prediction data and the current data is greater than or equal to a preset similarity, the electronic device determines that the parameters to be tested passes a verification, or when the similarity between the prediction data and the current data is less than the preset similarity, the electronic device determines that the parameters to be tested fails the verification.

According to the above embodiments, the parameters to be tested based on the automatically identified target function can be quickly and accurately tested.

In other embodiments, the objective function can also be used to perform a verification and residual analysis on the target data, relevant descriptions are not repeated.

According to the above embodiments, functions can be automatically identified and selected, the parameters to be tested can be automatically tested, efficiently and accurately.

Figure 2:
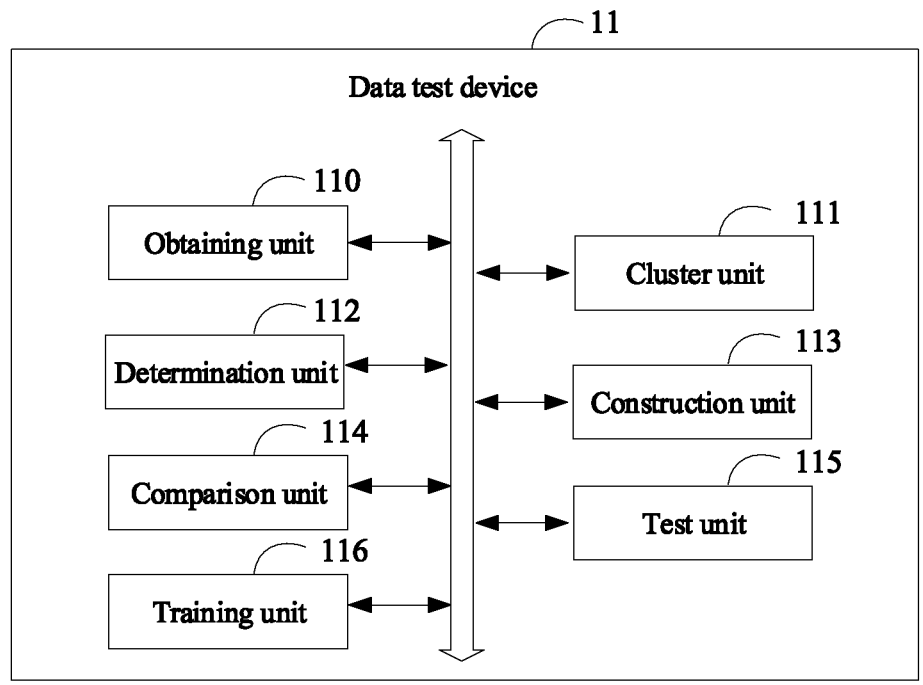
FIG. 2 is a block diagram of an embodiment of function modules of a data test device.

FIG. 2 is a block diagram of an embodiment of function modules of a data test device The data test device 11 includes an obtaining unit 110, a cluster unit 111, a determination unit 112, a construction unit 113, a comparison unit 114, a test unit 115, and a training unit 116. The units in the present embodiments refers to a series of computer program segments that can be executed by a processor 13, the units can complete fixed functions and are stored in a memory 12. In the embodiments, functions of each unit will be described in detail in subsequent embodiments.

In response to a received data test instruction for triggering the data test, the obtaining unit 110 obtains parameters to be tested from the data test instruction.

The data test instruction can be triggered by related workers, such as testers.

In one embodiment, the parameters to be tested may include, but are not limited to, one or a combination of followings:

Voltage, resistance, current, frequency, temperature, and the like.

The obtaining unit 110 obtains target data corresponding to the parameters to be tested from an initial data set.

For example, when the parameters to be tested are voltages, the target data is a specific value of the voltages in the initial data set.

In one embodiment, before obtaining the target data corresponding to the parameters to be tested from the initial data set, the construction unit 113 constructs the initial data set.

The determination unit 112 determines a target working station that the parameters to be tested belongs to. The obtaining unit 110 acquires data of a previous working station corresponding to the target working station. The construction unit 113 constructs the initial data set by using the acquired data.

According to the above embodiments, correctness of parameter settings in a following station can be effectively verified based on the data of an upstream and previous working station.

In other embodiments, current station data can also be used to test a current station, and the present embodiments is not limited.

Based on a Density-Based Spatial Clustering of Applications with Noise (DBSCAN), the cluster unit 111 obtains at least one cluster by removing discrete points in the target data and performing clustering.

In other embodiments, the cluster unit 111 obtaining at least one cluster by removing discrete points in the target data and performing clustering based on the DBSCAN includes that: the cluster unit 111 obtains core points, boundary points, and noise points by marking the target data. The cluster unit 111 determines the noise points as discrete points, and deletes the discrete points. The cluster unit 111 calculates a first distance between every two core points. The cluster unit 111 obtains at least one initial cluster by connecting all the core points within epsilon (Eps) at a first distance. For each boundary point, the cluster unit 111 calculates a second distance between the boundary point and a center point of each of the at least one initial cluster. The cluster unit 111 divides the boundary points into initial clusters corresponding to a smallest second distance. The cluster unit 111 obtains the at least one cluster by integrating all divided initial clusters.

The Eps refers to a DBSCAN algorithm parameter, and the Eps belongs to a distance threshold.

In one embodiment, a number of the at least one cluster to be formed of the DBSCAN do not need to be known in advance, and the noise points can be identified and removed. Clusters of any shape can be found, recognition ability is better, and the DBSCAN is more suitable for station parameters.

The determination unit 112 determines a number of the at least one cluster.

In one embodiment, the determined number is used to determine whether conditions for constructing a scatter chart are met.

In response that the determined number is greater than a preset threshold, the construction unit 113 constructs the scatter chart based on at least one cluster.

For example, the preset threshold may be 0.

The method of constructing the scatter chart is not limited by the above mentioned embodiments.

In one embodiment, when the determined number is less than or equal to the preset threshold, the test is terminated.

The comparison unit 114 obtains an objective function by inputting the scatter chart into a pre-trained prediction model for performing a comparison.

In one embodiment, the training unit 116 trains the prediction model.

The obtaining unit 110 obtains all scatter charts in historical data. The training unit 116 obtains the prediction model by performing a classification training on all the scatter charts.

Specifically, the training unit 116 training the prediction model includes: obtaining all scatter plots in historical data; acquiring a first number of scatter plots from the all scatter plots as training data, and acquiring a second number of scatter plots as test data, where the first number is greater than the second number; using the training data to train a preset neural network model to obtain a prediction model; using the test data to test the prediction model and calculating a test pass rate; determining whether the test pass rate is greater than a preset pass rate threshold; when the test pass rate is greater than the preset pass rate threshold, ending the training of the prediction model.

When the test pass rate is less than or equal to the preset pass rate threshold, a third number of scatter plots from the all scatter plots are obtained and added to the training data to obtain new training data; use the new training data to train the preset neural network model the to obtain a new prediction model. The test data is used to test the new predictive model. Repeat the above process until the test pass rate is greater than the preset pass rate threshold, the training is stopped.

According to the above embodiments, the prediction model is trained according to the historical data, and the prediction model can be used in more comprehensive technology fields.

When the comparison of the scatter chart is failed, the determination unit 112 determines a type of the scatter chart. The obtaining unit 110 obtains a function corresponding to the type of the scatter chart. The training unit 116 uses the obtained function as a risk loss function of the prediction model to retrain the prediction.

In one embodiment, when the comparison of the scatter chart is failed, a function corresponding to the scatter chart may not be obtained.

By performing the retraining on the prediction model, the prediction model can be continuously updated according to a current test situation, thus ensuring a more reliable and accurate prediction model. The process of using the risk loss function to calculate a risk loss and the process of retraining the prediction model are existing technologies and will not be elaborated.

In one embodiment, the comparison unit 114 obtaining the objective function by inputting the scatter chart into the pre-trained prediction model for performing a comparison includes that: the comparison unit 114 obtains the objective function by applying a configuration image comparison algorithm to input the scatter chart into the prediction model for performing a comparison.

The configuration image comparison algorithm may include, but is not limited to a pixel point comparison algorithm, a block comparison algorithm, the present embodiments is not so limited.

The test unit 115 uses the target data as an independent variable of the target function to calculate a function value and obtains a calculation result, and the test unit 115 verifies the parameters to be tested according to the calculation result.

In one embodiment, the calculation result may be outputted.

In one embodiment, the test unit 115 using the target data as an independent variable of the target function to calculate a function value and obtaining a calculation result, and verifying the parameters to be tested according to the calculation result includes that: the test unit 115 acquires current data corresponding to the parameters to be tested, and acquires prediction data corresponding to the parameters to be tested from the calculation result. The test unit 115 calculates a similarity between the prediction data and the current data. When the similarity between the prediction data and the current data is greater than or equal to a preset similarity, the test unit 115 determines that the parameters to be tested passes a verification, or when the similarity between the prediction data and the current data is less than the preset similarity, the test unit 115 determines that the parameters to be tested fails the verification.

According to the above embodiments, the parameters to be tested based on the automatic identification of target function can be quickly and accurately tested.

In other embodiments, the objective function can also be used to perform a verification and residual analysis on the target data, descriptions thereof are not repeated here.

According to the above embodiments, functions can be automatically identified and selected, the parameters to be tested can be automatically tested efficiently and accurately.

Figure 3:
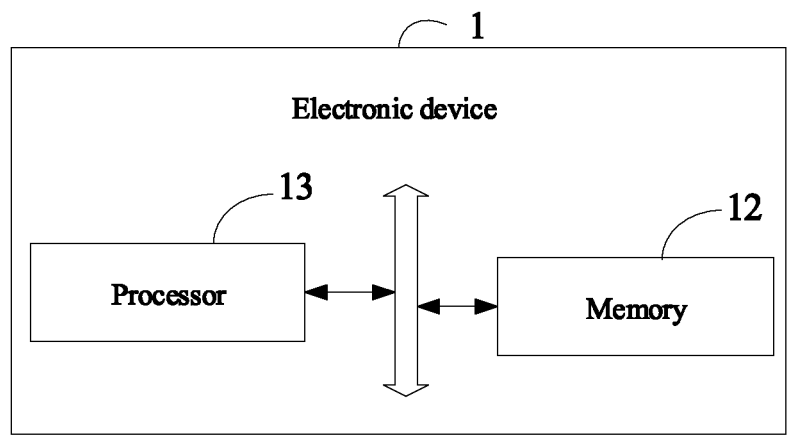
FIG. 3 is a block diagram of an embodiment of an electronic device that executes the data test method based on image analysis.

FIG. 3 is a block diagram of an embodiment of an electronic device that executes the data test method.

The electronic device 1 includes a memory 12, a processor 13, and a bus. The electronic device 1 also includes a computer program stored in the memory 12 and running on the processor 13, such as a data test program.

It will be understood by those skilled in the art that FIG. 3 is merely showing an example of the electronic device 1, a limitation on the electronic device 1 is not constituted. Other examples of the electronic device 1 may have a bus-type structure or a star structure. The electronic device 1 may include more or less components than those illustrated, or may combine certain components, or have different components. The electronic device 1 may also include input and output devices, network access devices, and the like.

It should be noted that the electronic device 1 is only one example. When other existing or future electronic products can be adapted to the present embodiments, they should also be included in a protection scope of the present embodiments and included here by reference.

The memory 12 may include at least one type of readable storage medium, the readable storage medium may include flash memory, mobile hard disk, multimedia card, card-type memory (for example, Secure Digital (SD) or Data Register (DX) memory, etc.), magnetic memory, magnetic disk, optical disk, etc. The memory 12 may be an internal storage unit of the electronic device 1 in some embodiments, such as a mobile hard disk of the electronic device 1. In other embodiments, the memory 12 may also be an external storage device of the electronic device 1, such as a plug-in mobile hard disk, a smart memory card (Smart Media Card, SMC), a SD Card, a Flash Card and the like on the electronic device 1. The memory 12 may also include both an internal storage unit of the electronic device 1 and an external storage device. The memory 12 can be used not only to store application software and various data installed in the electronic device 1, such as codes of a data test program, etc., but also to temporarily store data that has been output or will be output.

The processor 13 may be composed of integrated circuits in some embodiments, for example, may be composed of a single packaged integrated circuit, or may be composed of multiple integrated circuits with same function or different functions, including combinations of one or more central processing unit (CPU), microprocessor, digital processing chip, graphics processor, and various control chips. The processor 13 is a control core of the electronic device 1, which uses various interfaces and lines to connect various components of the electronic device 1. The processor 13 runs or executes programs or modules stored in the memory 12 (such as executing a data test program, etc.), and calls up data stored in the memory 12 to perform various functions of the electronic device 1 and to process data.

The processor 13 executes an operating system of the electronic device 1 and various installed applications. The processor 13 executes the application program to implement steps in the foregoing embodiments of the data testing method, such as steps shown in FIG. 1.

The computer program may be divided into one or more units, and the one or more units are stored in the memory 12 and executed by the processor 13 to apply the method. The one or more units may be a series of computer program instruction segments capable of completing specific functions, and the instruction segments are used to describe the execution process of the computer program in the electronic device 1. For example, the computer program may be divided into an obtaining unit 110, a cluster unit 111, a determination unit 112, a construction unit 113, a comparison unit 114, a test unit 115, a training unit 116.

The above-mentioned integrated unit implemented in the form of a software function module may be stored in a computer readable storage medium. The above-mentioned software function module is stored in a storage medium and includes several instructions to make a computer device (which can be a personal computer, a computer device, or a network device, etc.) or a processor to execute methods described in each embodiment of the present embodiment.

It should be understood that the described embodiments are for illustrative purposes only, and are not limited in structure in any scope of the patent application.

FIG. 3 only shows the electronic device 1 with components 12-13. Those skilled in the art will understand that the structure shown in FIG. 3 does not constitute a limitation on the electronic device 1, and may include less or more components, or have a combination of certain components, or have different component arrangements.

With reference to FIG. 1, the memory 12 in the electronic device 1 stores multiple instructions to implement a data testing method, and the processor 13 can execute the multiple instructions to implement that: in response to a received data test instruction for triggering the data test, the processor 13 obtains parameters to be tested from the data test instruction. The processor 13 obtains target data corresponding to the parameters to be tested from an initial data set. Based on a Density-Based Spatial Clustering of Applications with Noise (DBSCAN), the processor 13 obtains at least one cluster by removing discrete points in the target data and performing clustering. The processor 13 determines a number of the at least one cluster. In response that the determined number is greater than a preset threshold, the processor 13 constructs the scatter chart based on at least one cluster. The processor 13 obtains an objective function by inputting the scatter chart into a pre-trained prediction model for performing a comparison. The electronic device obtains an calculation result by performing a regression analysis on the target data with the objective function, and the electronic device verifies the parameters to be tested according to the calculation result.

Specifically, for specific implementation of above-mentioned instructions by the processor 13, reference can be made to the description of relevant steps in the embodiments corresponding to FIG. 1, which will not be repeated here.

In the several embodiments provided by the present embodiments, it should be understood that the disclosed system, apparatus, and method may be implemented in other manners. For example, the device embodiments described above are merely illustrative. For example, the division of the modules is only a logical function division, the actual implementation may have other manner of division.

The modules described as separate components may or may not be physically separated, and the components displayed as modules may or may not be physical modules, that is, may be located in one place, or may be distributed in multiple network modules. Some or all of the modules may be selected according to actual needs to achieve the purpose of the method.

In addition, each functional module in each embodiment of the present embodiments may be integrated into one processing unit, or each unit may exist as a standalone unit, or two or more modules may be integrated into one unit. The above integrated unit can be implemented in the form of hardware or in the form of hardware plus software function modules.

It is apparent to those skilled in the art that the present embodiments is not limited to the details of the above-described exemplary embodiments, and the present embodiments can be embodied in other specific forms without departing from the spirit or essential characteristics of the present embodiments. Therefore, the present embodiments are to be considered as illustrative and not restrictive, and the scope of the present embodiments is to be defined by the appended claims instead all changes in the meaning and scope of equivalent elements are also to be included in the present embodiments. Drawings which accompany the claims should not be construed as limiting the claim. In addition, it is to be understood that the word "including" does not exclude other elements or steps. A plurality of modules or devices recited in the system claims can also be implemented by a software-based or hardware-based units or devices. The particular ordering of words does not denote any particular order.

It should be noted that the above embodiments are only for explaining the technical solutions of the present embodiments and are not intended to be limiting, and the present embodiments describes preferred embodiments. Modifications or equivalents can be made or used without departing from the spirit and scope of the present embodiments.

What is claimed is:

1. A data test method, applied to an electronic device, the method comprising:

in response to a received data test instruction for triggering the data test, obtaining parameters to be tested from the data test instruction;

determining a target working station that the parameters to be tested belongs to;

acquiring data of a previous working station corresponding to the target working station;

constructing an initial data set by using the acquired data;

obtaining target data corresponding to the parameters to be tested from the initial data set;

based on a Density-Based Spatial Clustering of Applications with Noise (DBSCAN), obtaining at least one cluster by removing discrete points in the target data and performing clustering, which comprises: obtaining core points, boundary points and noise points by marking target data; determining the noise points as discrete points, and deleting the discrete points; calculating a first distance between every two core points; obtaining at least one initial cluster by connecting all the core points within epsilon (Eps) at a first distance; for each boundary point, calculating a second distance between the each boundary point and a center point of each of the at least one initial cluster; dividing the boundary points into initial clusters corresponding to a smallest second distance; obtaining the at least one cluster by integrating all divided initial clusters;

determining a number of the at least one cluster;

in response that the determined number is greater than a preset threshold, constructing a scatter chart based on at least one cluster;

obtaining an objective function by inputting the scatter chart into a pre-trained prediction model for performing a comparison;

using the target data as an independent variable of the target function to calculate a function value and obtaining a calculation result, and verifying the parameters to be tested according to the calculation result.

2. The data test method according to claim 1, further comprising:

obtaining all scatter charts in historical data;

obtaining the prediction model by performing a classification training on the all scatter charts.

3. The data test method according to claim 1, wherein the obtaining the objective function by inputting the scatter chart into the pre-trained prediction model for performing a comparison comprises:

obtaining the objective function by applying a configuration image comparison algorithm to input the scatter chart into the prediction model for performing a comparison.

4. The data test method according to claim 1, wherein the method of using the target data as an independent variable of the target function to calculate a function value and obtaining a calculation result, and verifying the parameters to be tested according to the calculation result comprises:

acquiring current data corresponding to the parameters to be tested, and acquiring prediction data corresponding to the parameters to be tested from the calculation result;

calculating a similarity between the prediction data and the current data;

when the similarity between the prediction data and the current data is greater than or equal to a preset similarity, determining that the parameters to be tested passes a verification; or when the similarity between the prediction data and the current data is less than the preset similarity, determining that the parameters to be tested fails the verification.

5. The data test method according to claim 1, further comprising:

determining a type of the scatter chart when the comparison of the scatter chart is failed;

obtaining a function corresponding to the type of the scatter chart;

using the obtained function as a risk loss function of the prediction model to retrain the prediction.

6. An electronic device, comprising:

at least one processor; and a memory storing a plurality of instructions, which when executed by the processor, causes the at least one processor to:

in response to a received data test instruction for triggering the data test, obtain parameters to be tested from the data test instruction;

determine a target working station that the parameters to be tested belongs to;

acquire data of a previous working station corresponding to the target working station;

construct an initial data set by using the acquired data;

obtain target data corresponding to the parameters to be tested from the initial data set;

based on a Density-Based Spatial Clustering of Applications with Noise (DBSCAN), obtain at least one cluster by removing discrete points in the target data and perform clustering, and the at least one cluster being obtained by: obtaining core points, boundary points and noise points by marking target data; determining the noise points as discrete points, and deleting the discrete points; calculating a first distance between every two core points; obtaining at least one initial cluster by connecting all the core points within epsilon (Eps) at a first distance; for each boundary point, calculating a second distance between the each boundary point and a center point of each of the at least one initial cluster; dividing the boundary points into initial clusters corresponding to a smallest second distance; obtaining the at least one cluster by integrating all divided initial clusters;

determine a number of the at least one cluster;

in response that the determined number is greater than a preset threshold, construct a scatter chart based on at least one cluster;

obtain an objective function by inputting the scatter chart into a pre-trained prediction model for performing a comparison;

use the target data as an independent variable of the target function to calculate a function value and obtain a calculation result, and verify the parameters to be tested according to the calculation result.

7. The electronic device according to claim 6, wherein the at least one processor is further caused to:

obtain all scatter charts in historical data;

obtain the prediction model by performing a classification training on the all scatter charts.

8. The electronic device according to claim 6, wherein the at least one processor is further caused to:

obtain the objective function by applying a configuration image comparison algorithm to input the scatter chart into the prediction model for performing a comparison.

9. The electronic device according to claim 6, wherein the at least one processor is further caused to:

acquire current data corresponding to the parameters to be tested, and acquire prediction data corresponding to the parameters to be tested from the calculation result;

calculate a similarity between the prediction data and the current data;

when the similarity between the prediction data and the current data is greater than or equal to a preset similarity, determine that the parameters to be tested passes a verification; or when the similarity between the prediction data and the current data is less than the preset similarity, determine that the parameters to be tested fails the verification.

10. The electronic device f according to claim 6, wherein the at least one processor is further caused to:

determine a type of the scatter chart when the comparison of the scatter chart is failed;

obtain a function corresponding to the type of the scatter chart;

use the obtained function as a risk loss function of the prediction model to retrain the prediction.

11. A non-transitory storage medium having stored thereon instructions that, when executed by a processor of an electronic device, causes the processor of the electronic device to perform a data test method based on image analysis, the method comprising:

in response to a received data test instruction for triggering the data test, obtaining parameters to be tested from the data test instruction;

determining a target working station that the parameters to be tested belongs to;

acquiring data of a previous working station corresponding to the target working station;

constructing an initial data set by using the acquired data;

obtaining target data corresponding to the parameters to be tested from the initial data set;

based on a Density-Based Spatial Clustering of Applications with Noise (DBSCAN), obtaining at least one cluster by removing discrete points in the target data and performing clustering, which comprises: obtaining core points, boundary points and noise points by marking target data; determining the noise points as discrete points, and deleting the discrete points; calculating a first distance between every two core points; obtaining at least one initial cluster by connecting all the core points within epsilon (Eps) at a first distance; for each boundary point, calculating a second distance between the each boundary point and a center point of each of the at least one initial cluster; dividing the boundary points into initial clusters corresponding to a smallest second distance; obtaining the at least one cluster by integrating all divided initial clusters;

determining a number of the at least one cluster;

in response that the determined number is greater than a preset threshold, constructing a scatter chart based on at least one cluster;

obtaining an objective function by inputting the scatter chart into a pre-trained prediction model for performing a comparison;

using the target data as an independent variable of the target function to calculate a function value and obtaining a calculation result, and verifying the parameters to be tested according to the calculation result.

12. The non-transitory storage medium according to claim 11, further comprising:

obtaining all scatter charts in historical data;

obtaining the prediction model by performing a classification training on the all scatter charts.

13. The non-transitory storage medium according to claim 11, wherein the obtaining the objective function by inputting the scatter chart into the pre-trained prediction model for performing a comparison comprises:

obtaining the objective function by applying a configuration image comparison algorithm to input the scatter chart into the prediction model for performing a comparison.

14. The non-transitory storage medium according to claim 11, wherein the method of using the target data as an independent variable of the target function to calculate a function value and obtaining a calculation result, and verifying the parameters to be tested according to the calculation result comprises:

acquiring current data corresponding to the parameters to be tested, and acquiring prediction data corresponding to the parameters to be tested from the calculation result;

calculating a similarity between the prediction data and the current data;

when the similarity between the prediction data and the current data is greater than or equal to a preset similarity, determining that the parameters to be tested passes a verification; or when the similarity between the prediction data and the current data is less than the preset similarity, determining that the parameters to be tested fails the verification.

* * * * *